United States Patent
Buvid et al.

(10) Patent No.: US 10,080,951 B2
(45) Date of Patent: Sep. 25, 2018

(54) SIMULATING VIRTUAL TOPOGRAPHY USING TREADMILLS

(71) Applicant: INTERNATIONAL BUSINESS MACHINES CORPORATION, Armonk, NY (US)

(72) Inventors: Daniel J. Buvid, Rochester, MN (US); Eric J. Campbell, Rochester, MN (US); Sarah K. Czaplewski, Rochester, MN (US); Christopher W. Steffen, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 92 days.

(21) Appl. No.: 15/241,319

(22) Filed: Aug. 19, 2016

(65) Prior Publication Data
US 2018/0050256 A1  Feb. 22, 2018

(51) Int. Cl.
*A63B 24/00* (2006.01)
*A63B 71/06* (2006.01)
(Continued)

(52) U.S. Cl.
CPC .......... *A63B 71/0622* (2013.01); *A63B 22/02* (2013.01); *A63B 24/0087* (2013.01);
(Continued)

(58) Field of Classification Search
CPC ............ A63B 2220/30; A63B 2220/51; A63B 2220/80; A63B 2071/0647;
(Continued)

(56) References Cited

U.S. PATENT DOCUMENTS

| | | | |
|---|---|---|---|
| 5,562,572 A * | 10/1996 | Carmein | A61H 3/00 |
| | | | 198/779 |
| 6,743,154 B2 | 6/2004 | Epstein | |

(Continued)

FOREIGN PATENT DOCUMENTS

| | | |
|---|---|---|
| EP | 2540354 A2 | 1/2013 |
| WO | 2007061317 A2 | 5/2007 |
| WO | 2012016132 A1 | 2/2012 |

*Primary Examiner* — Glenn Richman
(74) *Attorney, Agent, or Firm* — Patterson + Sheridan, LLP

(57) ABSTRACT

Embodiments herein describe techniques for operating an omnidirectional treadmill, the techniques include receiving VR (virtual reality) topographical information comprising a VR environment, and displaying the VR environment to a user wearing a headset. VR topographical information includes information about VR elements in front of the user in the VR environment relative to a facing direction of the user in the VR environment. The method includes sending topographical signals to active elements in an omnidirectional treadmill based upon the VR topographical information where the omnidirectional treadmill permits the user to move along at least two perpendicular directions of motion on a surface of the omnidirectional treadmill. The techniques include activating the active elements, based upon the VR topographical signals, to physically simulate the VR elements in the VR topographical information on the surface by at least one of expanding or contracting the active elements.

16 Claims, 10 Drawing Sheets

(51) Int. Cl.
*G06T 19/00* (2011.01)
*G06F 3/00* (2006.01)
*G06T 13/40* (2011.01)
*A63B 22/02* (2006.01)

(52) U.S. Cl.
CPC .............. *G06F 3/005* (2013.01); *G06T 13/40* (2013.01); *G06T 19/00* (2013.01); *A63B 2022/0271* (2013.01); *A63B 2071/0638* (2013.01); *A63B 2071/0647* (2013.01); *A63B 2220/30* (2013.01); *A63B 2220/51* (2013.01); *A63B 2220/80* (2013.01)

(58) Field of Classification Search
CPC .... A63B 2071/0638; A63B 2022/0271; A63B 71/0622; A63B 22/02; A63B 24/00; A63B 24/0062; A63B 24/0087; G06T 19/00; G06T 13/40; G06F 3/005
See application file for complete search history.

(56) References Cited

U.S. PATENT DOCUMENTS

| | | | |
|---|---|---|---|
| 8,790,222 | B2 | 7/2014 | Burger |
| 9,220,940 | B2 | 12/2015 | Al Kuwari |
| 9,239,616 | B1* | 1/2016 | Carrell ................ A63C 17/061 |
| 2004/0192511 | A1 | 9/2004 | Ein-Gal |
| 2005/0148432 | A1 | 7/2005 | Carmein |
| 2007/0060451 | A1 | 3/2007 | Lucas |
| 2007/0298937 | A1 | 12/2007 | Shah et al. |
| 2010/0022358 | A1* | 1/2010 | Schwaiger ......... A63B 22/0242 482/54 |
| 2012/0190504 | A1 | 7/2012 | Lee et al. |
| 2013/0281241 | A1 | 10/2013 | Watterson et al. |
| 2015/0213729 | A1 | 7/2015 | Rhea |
| 2015/0321337 | A1* | 11/2015 | Stephens, Jr. .......... B25J 9/1689 700/257 |
| 2017/0336860 | A1* | 11/2017 | Smoot .................... G06F 3/011 |

* cited by examiner

SIMULATED STAIRS
(MOVING FROM RIGHT TO LEFT)

FRICTIONLESS
OMNIDIRECTIONAL TREADMILL

SIMULATING VIRTUAL TOPOGRAPHY USING TREADMILLS

BACKGROUND

The present invention relates to enhancing a virtual reality (VR) experience using omnidirectional treadmills, and more specifically to activating active elements on the treadmills to simulate VR elements in the VR topographical information.

Omnidirectional treadmills permit a user to simulate travelling in all directions (forward, backward, left, right, and all combinations thereof) in a VR environment without leaving the omnidirectional treadmill.

SUMMARY

According to one embodiment described herein, a method includes receiving VR (virtual reality) topographical information comprising a VR environment, wherein the VR environment is displayed to a user wearing a headset, and wherein the VR topographical information comprises information about VR elements in front of the user in the VR environment relative to a facing direction of the user in the VR environment. The method includes sending topographical signals to active elements in an omnidirectional treadmill based upon the VR topographical information, wherein the omnidirectional treadmill permits the user to move along at least two perpendicular directions of motion on a surface of the omnidirectional treadmill. The method includes activating the active elements, based upon the VR topographical signals, to physically simulate the VR elements in the VR topographical information on the surface by at least one of expanding or contracting the active elements.

According to another embodiment described herein, an omnidirectional treadmill includes a processor and active elements controlled by the processor. The omnidirectional treadmill receives VR (virtual reality) topographical information comprising a VR environment. The VR environment is displayed to a user wearing a headset, and wherein the VR topographical information comprises information about VR elements in front of the user in the VR environment relative to a facing direction of the user in the VR environment. The omnidirectional treadmill is further configured to send topographical signals to the active elements in an omnidirectional treadmill based upon the VR topographical information. The omnidirectional treadmill permits the user to move along at least two perpendicular directions of motion on a surface of the omnidirectional treadmill. The omnidirectional treadmill is further configured to activate the active elements, based upon the VR topographical signals, to physically simulate the VR elements in the VR topographical information on the surface by at least one of expanding or contracting the active elements.

According to another embodiment described herein, a computer program product for operating an omnidirectional treadmill includes computer-readable program code executable by one or more computer processors to receive VR topographical information comprising a VR environment where the VR environment is displayed to a user wearing a headset and where the VR topographical information comprises information about VR elements in front of the user in the VR environment relative to a facing direction of the user in the VR environment. The program code is executable to send topographical signals to active elements in the omnidirectional treadmill based upon the VR topographical information where the omnidirectional treadmill permits the user to move along at least two perpendicular directions of motion on a surface of the omnidirectional treadmill. The program code is executable to activate the active elements, based upon the VR topographical signals, to physically simulate the VR elements in the VR topographical information on the surface by at least one of expanding or contracting the active elements.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
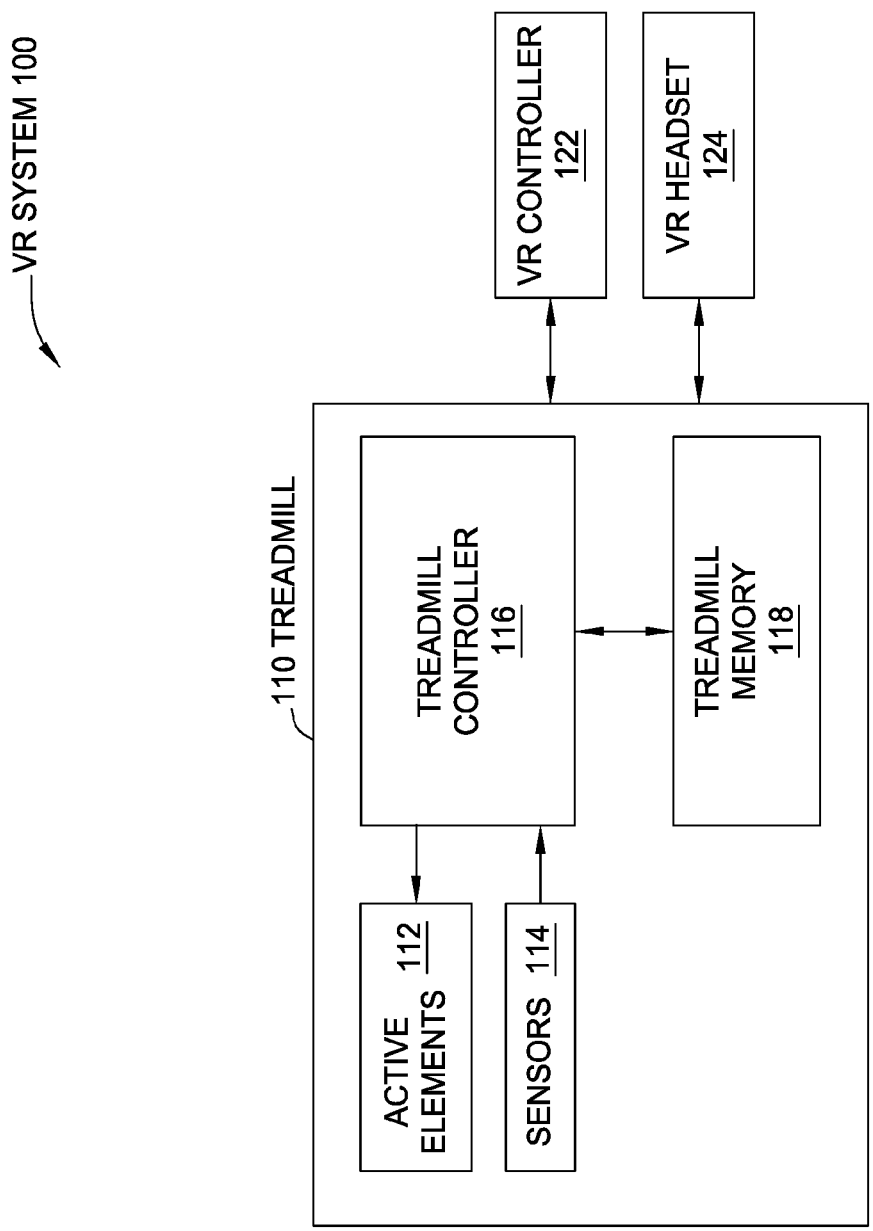
FIG. 1 is a block diagram of a VR system including an omnidirectional treadmill, a VR controller, and a VR headset according to one embodiment described herein.

FIG. 1 is a block of a VR (virtual reality) system 100 including an omnidirectional treadmill 110, a VR controller 122, and a VR headset 124 according to one embodiment described herein. The omnidirectional treadmill 110 includes a treadmill controller 116 (including a treadmill processor), active elements 112 in communication with the treadmill controller 116, sensors 114 in communication with the treadmill controller 116, and a treadmill memory 118 in communication with the treadmill controller 116. The omnidirectional treadmill 110 may be in communication with the VR controller 122 and with the VR headset 124.

In one embodiment, the user wears the VR headset 124 which can physically immerse the user in a VR environment—e.g., a 3D environment. The angle and the elevation of the headset 124 can control the user's view of the VR environment. For example, by tilting her head down, the user can view the feet of an avatar representing the user in the VR environment. In this manner, the VR headset 124 can adjust the view and orientation of the user in the VR environment. In other embodiments, the VR headset 124 may be replaced by a fixed VR display that may wrap around the user as she stands in the treadmill.

The VR controller 122 and VR headset 124 are communicatively coupled to the treadmill 110 to permit user (or the user's avatar) to move in the VR environment. For example, using the sensors 114, the treadmill controller 116 can determine that the user is moving in a particular direction along the surface of the treadmill 110. By relaying this information to the VR controller 122, the controller 116 can update the view of the user in the headset 124 such that the user perceives moving in the VR environment in the same direction. For example, the user may look to his left while wearing the headset 124 but be walking straight ahead on the treadmill 110. The treadmill controller 116 can inform the VR controller 122 the direction the user is traveling, which in turn, updates the display screen in the VR headset 124 so that the user perceives herself moving forward while looking to the left in the VR environment. In this manner, the treadmill 110 provides an immersive experience where real world motions can be translated into motions in the VR environment.

To provide a more immersive experience, the treadmill 110 includes the active elements 112 which model or simulate the VR topography in the VR environment. For example, if there is a topographical feature such as a step or a rock in the direction of the user's travel in the VR environment, the VR controller 122 can provide the spatial location of the topographical feature relative to the user's avatar (and the dimensions of the topographical feature) to the treadmill controller 116 which controls the active elements 112 such that spatial location of the topographical feature relative to the user is created in the real-world. As described in detail below, the treadmill controller 116 controls the active elements 112 to form or simulate the virtual objects in the VR topography on the surface of the treadmill. For example, the user may step over, or on, a simulated version of the step or rock on the treadmill when moving in the VR environment.

Figure 2:
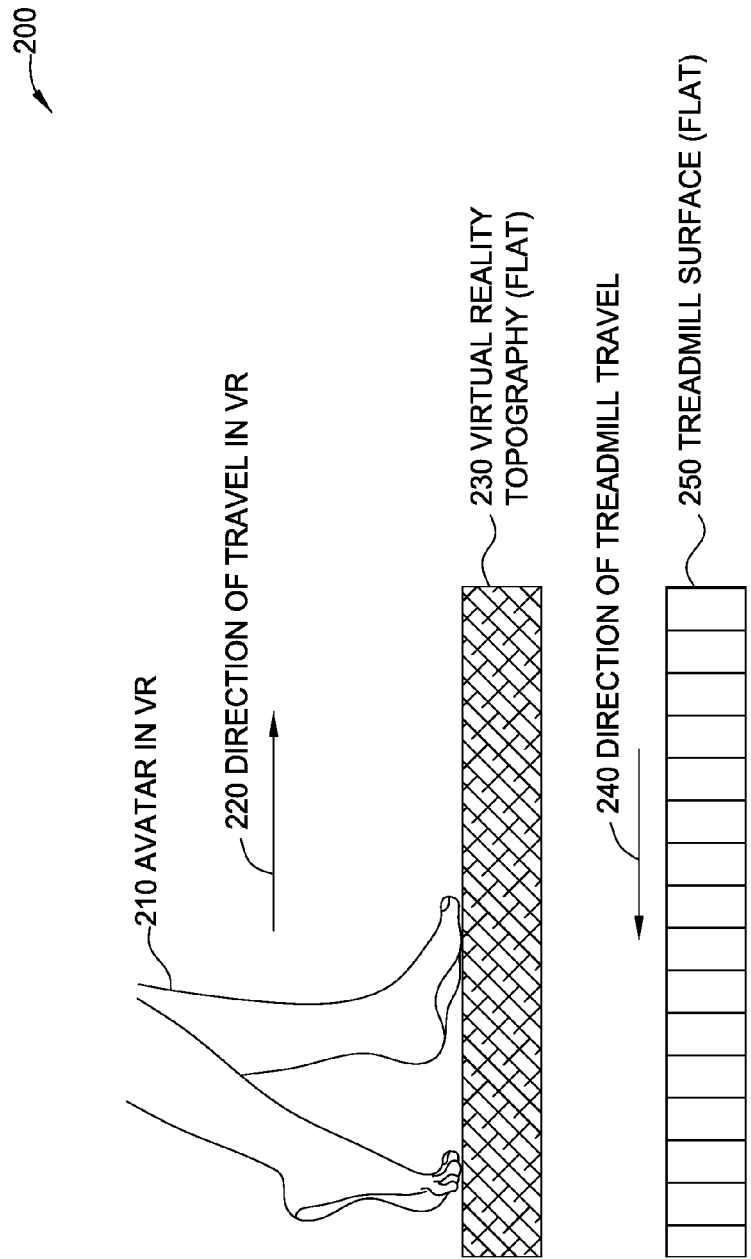
FIG. 2 is a diagram of an avatar in a VR environment travelling on a flat surface according to one embodiment described herein.

FIG. 2 is a diagram of an avatar 210 in a VR environment 200 travelling (from left to right) on a flat surface of VR topography 230 along a direction 220 of user travel in the VR environment 200. A flat surface of an omnidirectional treadmill 250 corresponds to (and simulates) the flat surface of the VR topography 230. The omnidirectional treadmill travels from right to left along direction 240 so that the user may "walk" (from left to right) along the omnidirectional treadmill while remaining approximately centered in the omnidirectional treadmill, thus simulating the avatar 210 walking on the flat surface of the VR topography 230 without walking off of the omnidirectional treadmill 250.

The user may view his avatar 210 in the VR environment 200 through a VR headset (perhaps from an aerial view), or the user may view the VR environment 200 from the eyes of his avatar. The avatar may be visible to other users in a multi-user game. However, the avatar 210 is optional and is not a requirement that the user be represented by the avatar 210 in the VR environment.

Figure 3:
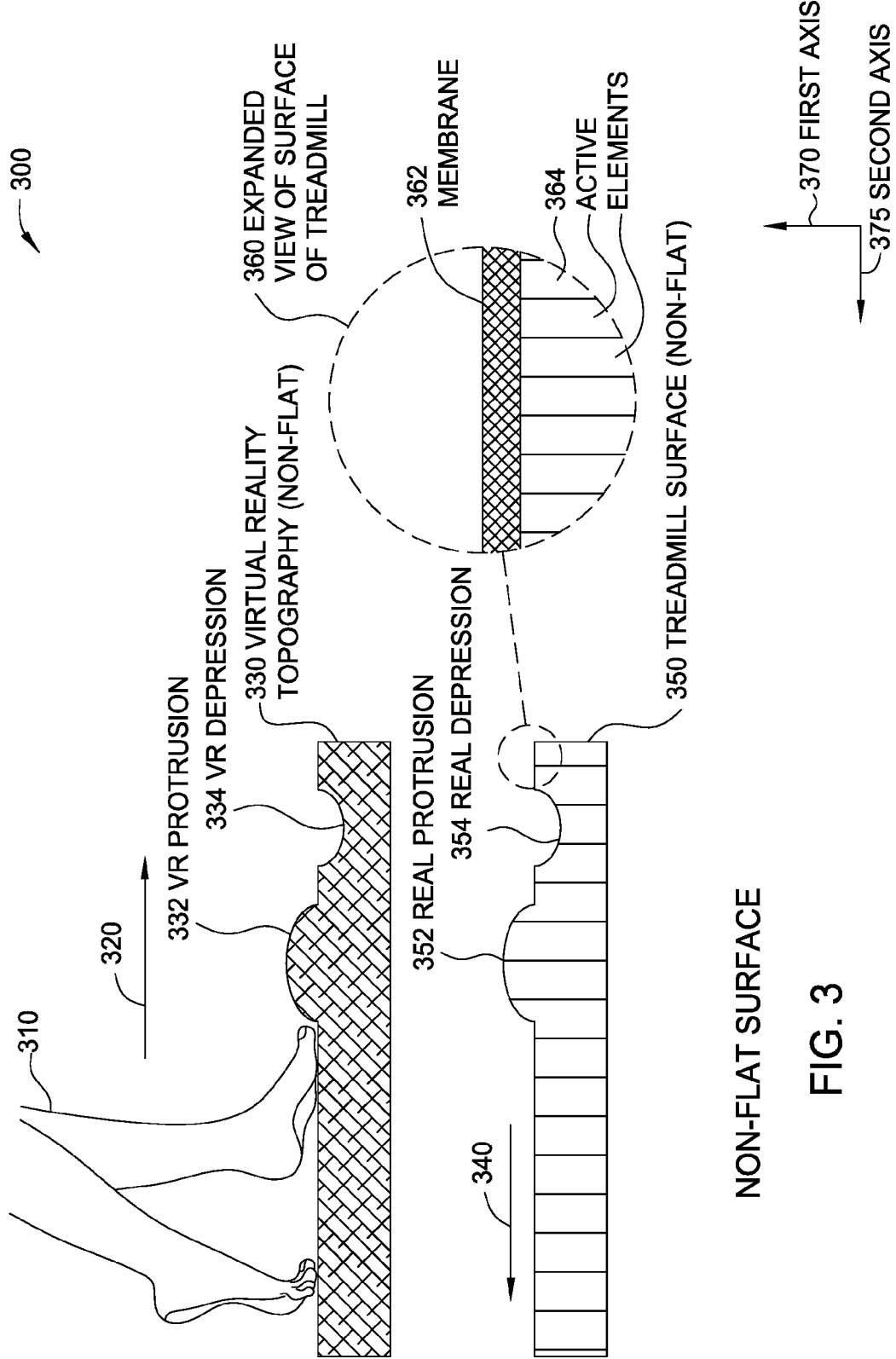
FIG. 3 is a diagram of an avatar in a VR environment travelling on a non-flat surface according to one embodiment described herein.

FIG. 3 is a diagram of a user avatar 310 in a VR environment 300 travelling in a direction 320 on a non-flat surface of VR topography 330 including a VR protrusion 332 and a VR depression 334. For example, VR protrusion 332 may be a rock on a path and VR depression 334 may be a ditch that the user must navigate over.

A non-flat surface of an omnidirectional treadmill 350 corresponds to (and simulates) the non-flat surface of the VR topography 330. A real protrusion 352 and a real depression 354 correspond to the VR protrusion 332 and the VR depression 334 respectively. In one embodiment, the protrusion 352 and depression 354 have the same dimensions (e.g., width and height) as the corresponding elements in the VR environment. Moreover, the protrusion 352 and depression 354 can have the same shape (e.g., curved, rectangular, etc.) as their virtual counterparts. In another embodiment, however, the protrusions 352 and depressions 354 have scaled dimensions relative to their corresponding VR elements or the real protrusions 352 and depressions 354 may have different shapes than the VR elements which may be due to the physical shape of the active elements. For example, it may be difficult to represent a circular rock in the VR topography using one or more active elements which has flat surfaces.

The non-flat surface of the omnidirectional treadmill 350 travels in direction 340 (from right to left) so that the user may "walk" (from left to right) along the omnidirectional treadmill 350 while remaining approximately centered in the omnidirectional treadmill 350, thus simulating walking on the non-flat VR topography 330 without walking off of the omnidirectional treadmill 350. For example, the user may be able to turn 360 degrees to travel in the 3D VR environment. The omnidirectional treadmill can permit the user to turn and travel in any direction in the VR environment while preventing the user from falling off the treadmill. Different examples of omnidirectional treadmills are described in more detail below.

In one embodiment, the treadmill controller 116 positions the user partially based upon the user's facing direction such that the user has more room to walk available in front of him than in back of him (the user is "off-center"); in this fashion the treadmill has more time (and space) to recognize that the user is walking forward and to smoothly begin moving the treadmill to compensate for the user walking forward.

Expanded view 360 illustrates active elements 364 and an optional membrane 362. In one embodiment, the active elements 364 remain stationary (fixed in location) as the membrane 362 slides over the active elements 364. Alternatively, the spatial relationship between the active elements 364 and the membrane 362 may remain fixed such that the active elements 364 and the membrane 362 travel in unison along the second axis 375. In one embodiment, one or more of the active elements 364 may have a ball bearing (not shown) between each of the active elements 364 and the membrane 362 such that the membrane 362 may easily slide over the active elements. In another embodiment, the membrane 362 may be omitted from the omnidirectional treadmill 350 and the top of the active elements 364 may form an interface so that a user's foot may easily slide (almost frictionless) over the active elements 364. For example, the tops of the active elements 364 may have smooth surfaces or ball bearings may be used to create the almost frictionless surface.

As shown, the active elements 364 expand along a first axis 370 to create a protrusion 352 and contract (or compress or recess) along the first axis 370 to create a depression 354 along the surface of the omnidirectional treadmill 350. Adjacent active elements 364 (e.g., a group of active elements 364) may be independently controlled to create the relatively smooth and curved protrusion 352 and the depression 354 to closely simulate the shapes and dimensions of VR protrusion 332 and VR depression 334 respectively. For example, to simulate a curved protrusion in the VR environment, the treadmill controller may activate multiple neighboring active elements 364 which expand to different heights to form the curve shown in FIG. 3. The membrane 362 may help to smooth any discontinuities between adjacent active elements 364.

The active elements 364 may be, as non-limiting examples, airbags, pistons, electroactive polymers (EAP), pins controlled by actuators, piezoelectric elements, eccentric cams, or some combination thereof.

As described in more detail below, the treadmill controller may form the protrusions 352 and depressions 354 on the treadmill to maintain the same spatial relationship to the location of the user on the treadmill as the relationship between the user's position in the VR environment and the VR protrusions 332 and VR depressions 334. If the user's movements on the treadmill directly map to moving the same distance in the VR environment, the user reaches the physical protrusion 352 on the treadmill at the same time the user's avatar reaches the VR protrusion 332. However, in other embodiments, the movement of the user on the treadmill is scaled relative to her movement in the VR environment. For example, the user walking on the treadmill may correlate to the user running in the VR environment in which case the spatial locations may also be scaled when the treadmill controller forms the protrusion 352 or depression 354.

Figure 4:
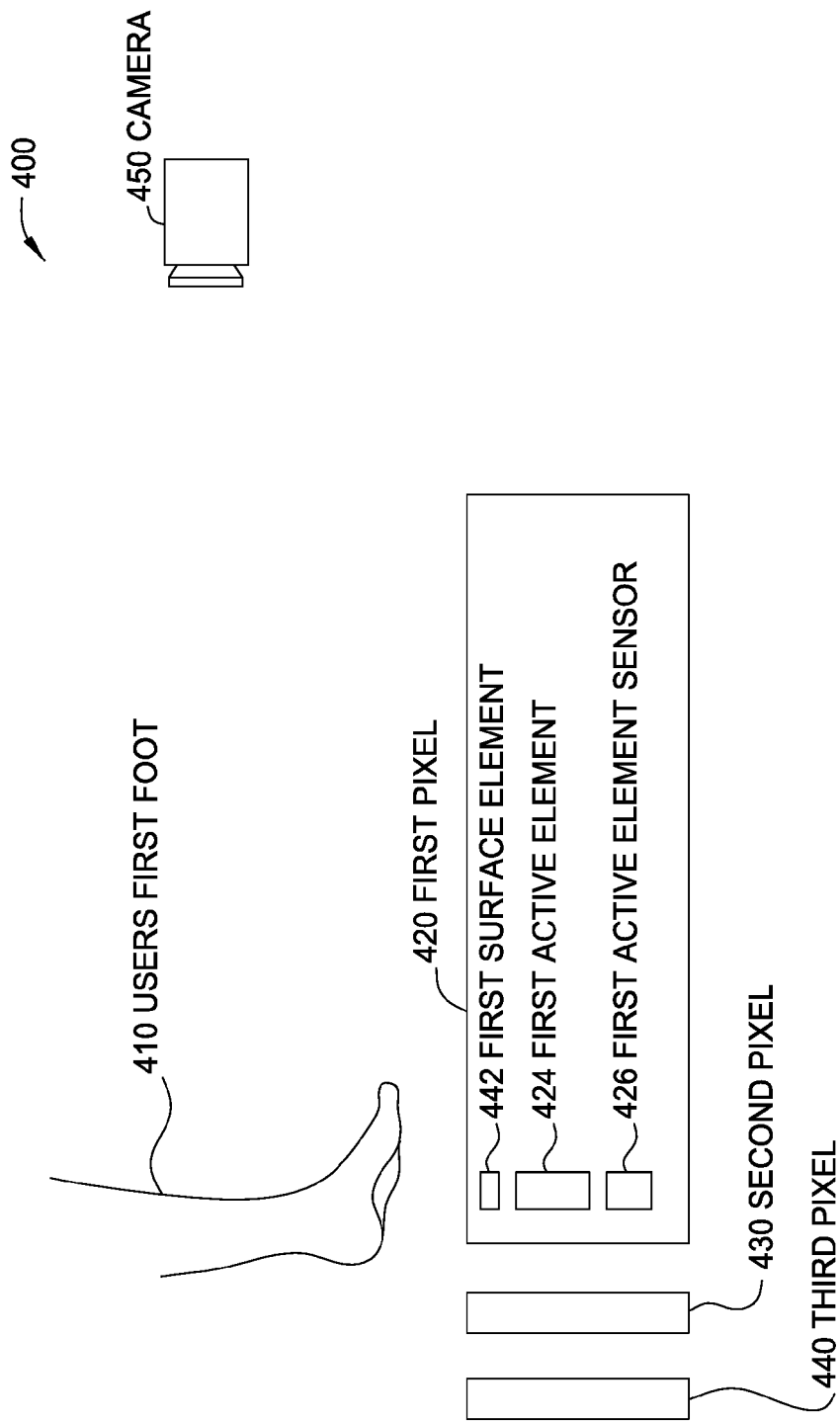
FIG. 4 is a diagram of a VR system including sensors according to one embodiment described herein.

FIG. 4 is a diagram of a VR system 400 including sensors according to one embodiment described herein. Briefly referring back to FIG. 3, each active element of active elements 364 may be grouped with an associated sensor to create an independent "pixel." For example, FIG. 4 illustrates a first pixel 420 that includes a first active element 424, a first active element sensor 426, and a first surface element 422. The first active element sensor 426 may be a piezoelectric sensor configured to measure a first force provided by a user's first foot 410. First active element sensor 426 may be an optical or electrical proximity sensor or contact sensor that detects proximity or contact with the user. In one example, by monitoring the signals produced by the first active element sensor 426, the treadmill controller can determine the location of the user on the treadmill. This information can be used to determine a direction or movement of the user in the VR environment.

First surface element 422 may be a ball bearing to reduce friction, or may be a portion of the membrane 362 from FIG. 3. Second pixel 430 and third pixel 440 may include features similar to first pixel 420. Alternatively, second pixel 430 may omit having a sensor, and any forces applied to second pixel 430 may be estimated by averaging forces measured by sensors of adjacent first pixel 420 and adjacent third pixel 440. First pixel 420 may form part of a rectangular array of pixels (not shown). The first active element sensor 426 may be located above (not shown) or below (shown) first active element 424.

Camera 450 is a sensor, and may be a visible light camera, an infrared camera, a depth sensing camera, or any other type of camera. Camera 450 can be used to determine a location of the user's first foot 410 and may be used to determine a traveling velocity of the user as the user walks across the surface of the omnidirectional treadmill. Camera 450 may determine a direction of the user is moving on the treadmill which is correlated to a movement in the VR environment.

The VR system 400 can be used by the treadmill controller to monitor the movements of the user on the treadmill which can be converted to movements in the VR environment. In one embodiment, the treadmill controller detects movements of the user by using the camera 450 and/or the first active element sensors 426 to determine when the user has moved in the real world. For example, if the treadmill has a movable top membrane, as the user moves, the treadmill controller detects these movements and causes the membrane to move in order to keep the user in the center of the treadmill (or at least prevent the user from falling off the treadmill). For example, if the user starts to run, the treadmill controller can detect the faster pace and increase the speed of the membrane in the opposite direction to keep the user from fall off the treadmill. If the treadmill is a frictionless treadmill, then the treadmill controller may not need to move a top membrane in response to user movements. In that example, the controller simply detects the user's movements (e.g., speed and direction) and reports those movements to the VR controller.

In another embodiment, the user may hold a hand held device which is used to control the movement of the treadmill. That is, instead of the treadmill controller moving the top membrane in response to a user motion, the user can use the hand held device to move the top membrane in a desired direction. For example, if the user wants to move forward in the virtual environment, the user presses a corresponding button on the hand held controller which moves the top membrane (forcing the user to move) and moves the user in the VR environment. Because the user is controlling the movement of the treadmill using the hand held device, the user may move away from the center of the treadmill. As a result, the treadmill controller may control the movement of the top membrane such that the user does not fall off the treadmill.

Figure 5:
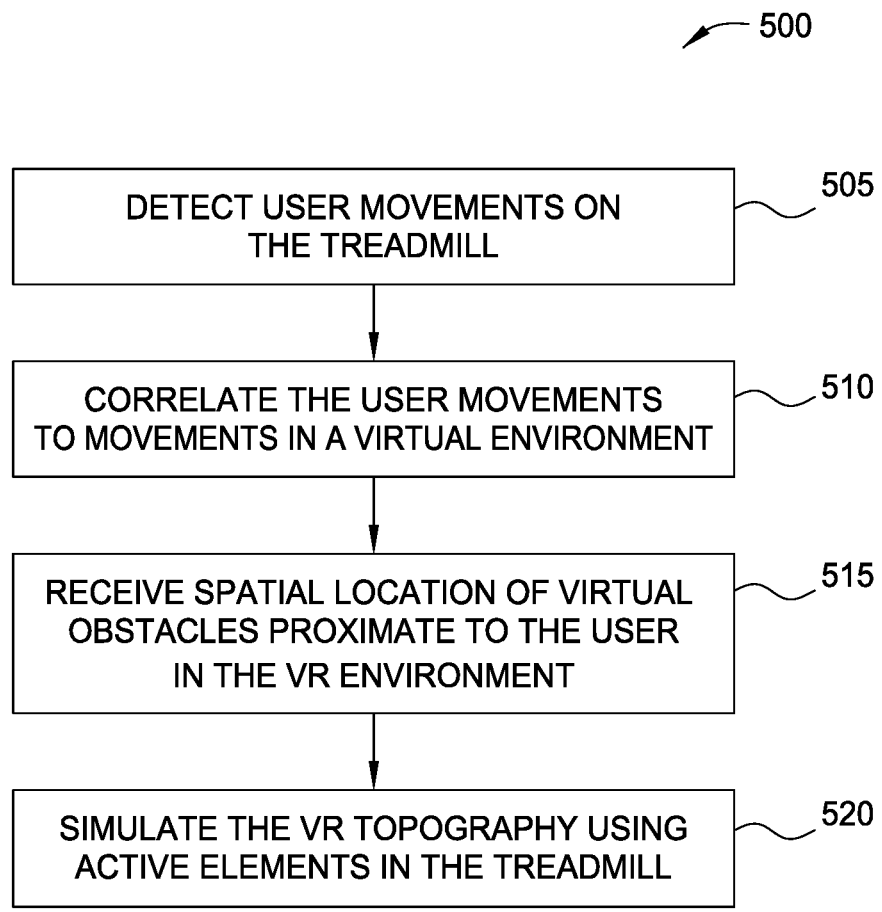
FIG. 5 is a control flowchart for operating a VR system according to one embodiment described herein.

FIG. 5 is a control flowchart 500 for operating a VR system according to one embodiment described herein. At block 505, the treadmill controller detects user movements on the treadmill. In one embodiment, the treadmill controller uses a camera or pressure sensor to detect when the user moves on the treadmill. Alternatively, the treadmill controller may receive input from a hand held controller which dictates a speed and direction the user wishes to travel in the VR environment. The treadmill controller can determine a speed and distance traveled by the user which is then sent to the VR controller. In one embodiment, if the treadmill has a moveable membrane or top surface, the treadmill controller moves the membrane using the detected user motion to prevent the user from falling off the treadmill.

At block 510, the VR controller correlates the user movements on the treadmill to movements in the VR environment. For example, the VR controller may map the various directions the user can move on the treadmill to corresponding directions in the VR environment. That way, the directions moved by the user in the real-world can be consistently mapped to respective directions in the VR environment. As such, when the VR controller receives direction data from the treadmill controller, the VR controller can map that direction to a direction in the VR environment. Similarly, the speed at which the user moves on the treadmill can be correlated to a speed in the VR environment. As the user speeds up or slows down, the movements of the avatar can also increase or decrease in the same or a scaled manner.

In one embodiment, the movement of the user's avatar in the VR environment is independent of the direction which the user is facing. For example, if the user is wearing a headset, the treadmill and VR controllers can move the user in a direction different from the one she is facing. In this manner, the treadmill can be used to move the user similar to how a person can move in the real-world where the user can face a first direction but move in a second, different direction. This change of position can then be used to change the view displayed to the user in the headset.

At block 515, the treadmill controller receives spatial location of virtual obstacles proximate to the user in the VR environment. In one embodiment, the VR controller transmits VR topography that includes obstacles that are within a predefined distance from the user—e.g., two feet. In this scenario, the VR controller can send information about a step that is one foot in front of the user along with a divot that is two feet to the right of the user, but would not send information about a virtual obstacle that is three feet to the left of the user. In one embodiment, the predefined distance is limited to the dimensions of the treadmill. For example, if the treadmill has a radius of two feet or a width and height of ten feet, the VR controller sends information about virtual objects that are within that distance from the user avatar in the virtual world.

At block 520, the treadmill controller simulates the VR topography using the active elements in the treadmill. In one embodiment, the treadmill controller simulates all the virtual objects that surround the avatar in the VR environment within the dimension of the treadmill. For example, although the user is currently walking in a first direction on the treadmill, the treadmill controller simulates any objects that are directly to the right or left of the user even if the user is currently not moving in that direction. Thus, if the user suddenly decides to move to the right or left, the active elements in the treadmill have already simulated the virtual objects at those locations.

Alternatively, the treadmill controller may simulate only the virtual object that are likely to be encountered by the user on the treadmill. For example, the controller may simulate only the objects that are currently within the direction of the user is traveling on the treadmill and VR environment within some tolerance in case the user changes direction. For example, if the user is moving along a first direction, the treadmill controller may simulate any virtual objects directly along that path as well as any virtual objects that are within 5-10 degrees to the right or left of the first direction. In another embodiment, the treadmill controller may use the landscape of the VR environment to selectively determine which objects to simulate. For example, if the user is currently moving along a path in the VR environment, the treadmill controller may simulate only the obstacles on that path but not simulate virtual objects that are not on the path.

Moreover, the treadmill controller may use the direction the user is facing in the VR environment to selectively determine which virtual objects to simulate. For example, if the user is moving along a path but is facing a second direction that, if the user followed, would lead her off the path, the treadmill controller may also simulate the objects along the second direction in anticipation that the user may choose to move along the second direction. In this manner, the treadmill controller may use the direction the user is moving as well as her current facing direction to predictively determine which of the virtual obstacles proximate to the user should be simulated.

In one embodiment, the treadmill controller may use the direction the user is facing (assuming the user is wearing a headset) to make simulating the virtual objects safer. If the user is moving in the VR environment and the treadmill in a direction different than the direction she is facing, using the active elements to simulate the virtual objects may create tripping hazards. Thus, the treadmill controller may simulate only the virtual objects that are within a field of view of the user regardless of the current direction she is moving in the VR environment to ensure that she will be able to see the virtual obstacles, and thus, anticipate the simulated objects on the surface of the treadmill.

The treadmill controller activates and/or deactivates the active elements 364 in response to the VR topography received from the VR controller. The treadmill controller may continuously or at intervals receive updated topography information from the VR controller and update the active elements on the treadmill. In one embodiment, the VR controller may send update topography data in response to the user changing positions in the VR environment. In another embodiment, the treadmill controller requests updated data from the VR controller each time the treadmill controller determines the user has moved on the treadmill.

In one embodiment, the treadmill controller may activate and deactivate the active elements under the user's feet even as the user does not move on the treadmill. For example, to simulate standing on a surface that is moving (e.g., a boat that moves in the waves) or being hit by waves while standing in the ocean, the treadmill controller may activate and deactivate the active elements (step 530) under the user to gently rock the user back and forth. In other words, the VR topographical information may change with time, even if the user is not moving laterally.

Figure 6:
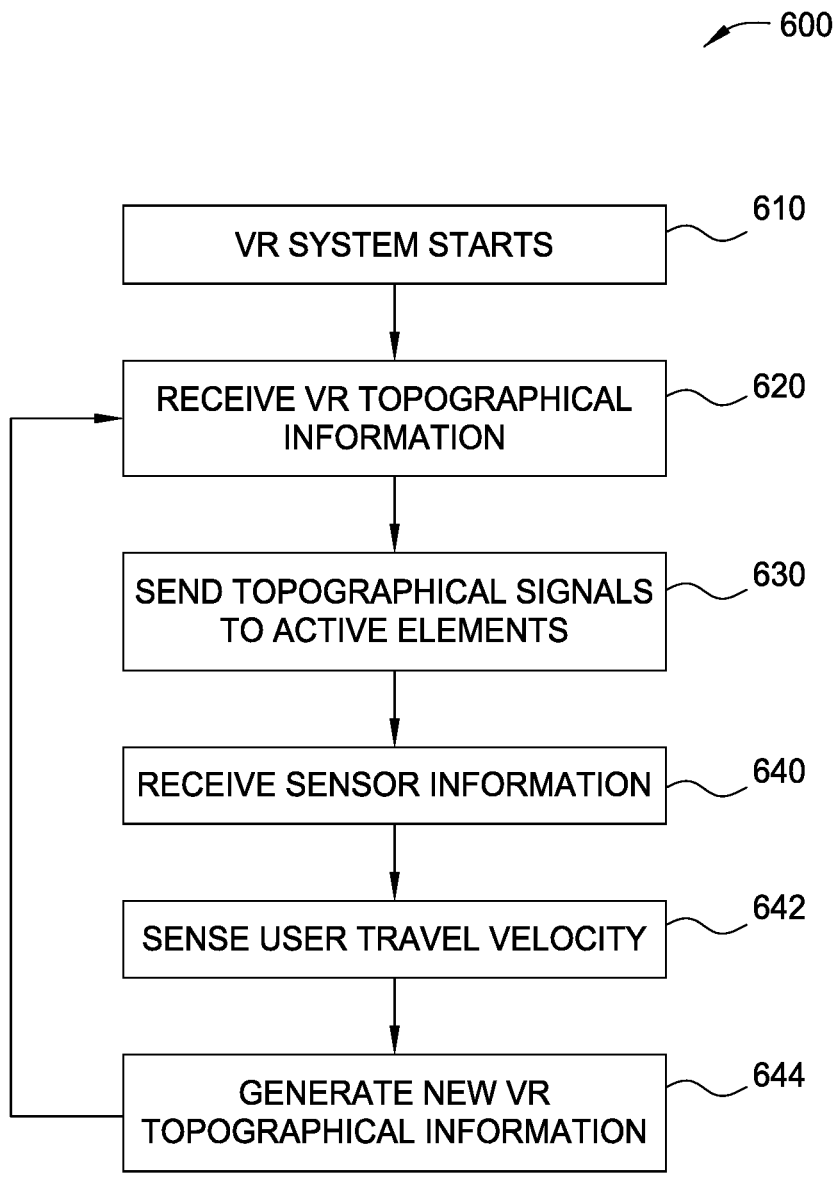
FIG. 6 is a control flowchart for operating a VR system with sensors according to one embodiment described herein.

FIG. 6 is a control flowchart 600 for operating a VR system with sensors according to one embodiment described herein. The VR system starts at step 610. The treadmill receives VR topographical information at step 620. The treadmill sends topographical signals to the active elements at step 630. The treadmill receives sensor information at step 640. For example, the sensors 114 may be cameras 450 or may be sensors 426 associated with individual active elements 424.

Step 642 senses information about the user such as: a user travel velocity, locations of the user's feet, a facing direction, and movements of the user's limbs. Step 644 generates new VR topographical information based upon the sensed user travel velocity and/or other sensed information.

Steps 620, 630, and 640 may now repeat such that the new VR topographical information is received and then corresponding new topographical signals are sent to the active elements. In this fashion, a user may walk along the treadmill as the active elements in the treadmill create protrusions and depressions corresponding to a VR environment in which the user's avatar is walking.

Figure 7:
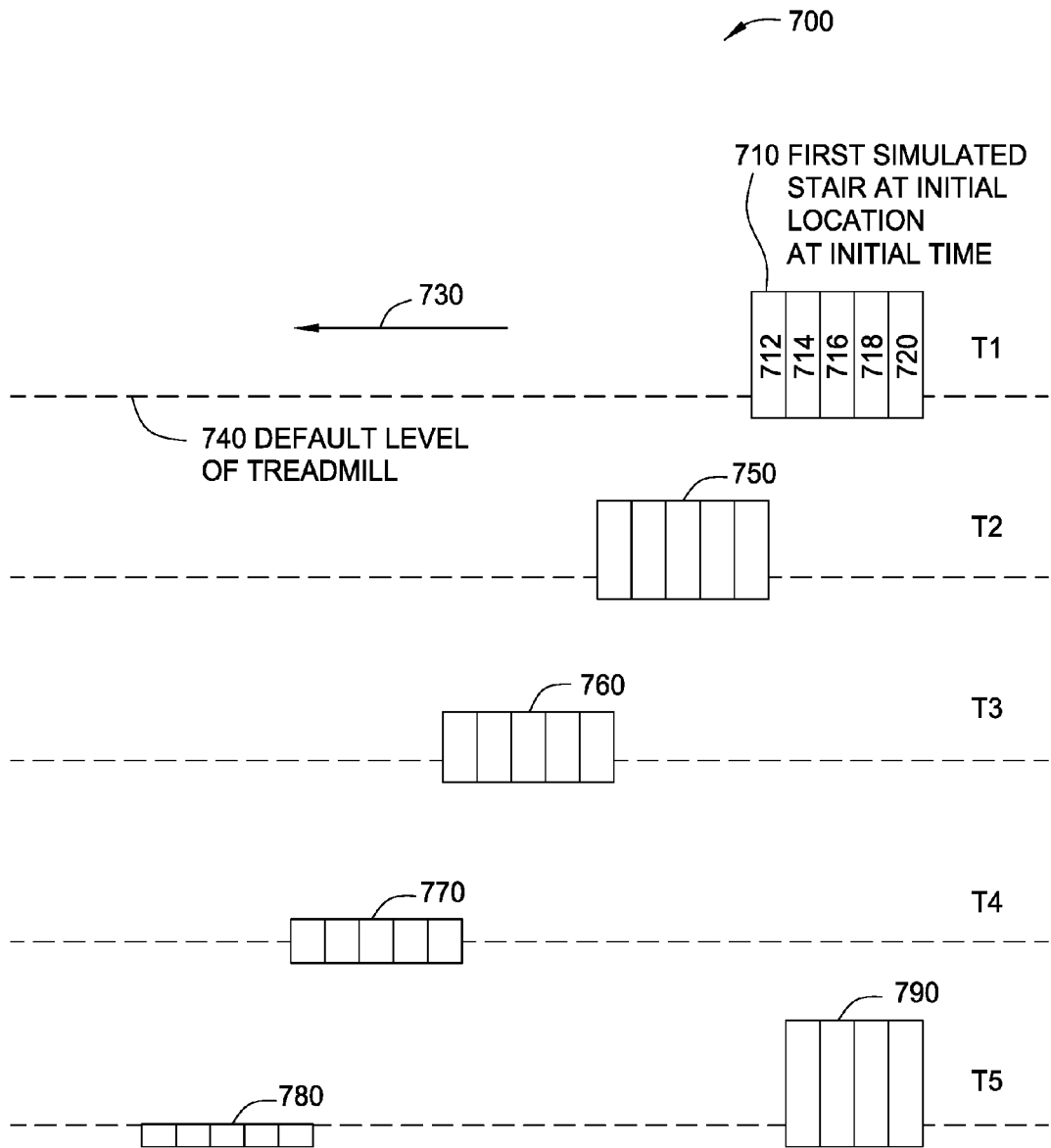
FIG. 7 is a diagram of simulating stairs in a VR environment according to one embodiment described herein.

FIG. 7 is a diagram of simulated stairs according to one embodiment described herein, showing snapshots of a single stair as time passes. A first simulated stair 710 is shown at an initial location and an initial time (T1), and then travels leftward and recedes as time passes (T2, T3, T4, and T5). The dashed lines indicate a default level 740 of the treadmill (when the active elements are deactivated).

The first simulated stair 710 (at the initial location and the initial time) comprises active elements 712, 714, 715, 718, and 720. The simulated escalator will simulate a stair travelling to the left in direction 730 and ending in at the default level 740 of the treadmill.

At time T2, the simulated stair 710 has moved slightly to the left along the surface of the treadmill and has receded (shrunk) slightly, as shown by stair 750. The active elements in stair 750 may be active elements 712, 714, 716, and 718 in an embodiment where the active elements travel in direction 730. Alternatively, the active elements in stair 750 may be distinct active elements (not 712, not 714, not 716, and not 718) in an embodiment where the active elements are stationary (and the optional membrane may be traveling in direction 730). As such, stair 750 may include some of the active elements used to generate stair 710 (e.g., elements 712 and 714) and different active elements—e.g., active elements to the left of active element 712.

At time T3, the simulated stair 710 has moved further to the left on the treadmill and receded more towards the default level 740, as shown by stair 760. At time T4, the simulated stair 710 has moved even further to the left and receded even more as shown by stair 770.

Finally, at time T5, the simulated stair 710 has moved far to the left and has receded to the default level of the treadmill as shown by stair 780. Also at time T5, a second simulated stair 790 is shown at the initial location of first simulated step 710. Additional steps may be present at intermediate locations and intermediate heights, but are not shown on this figure.

Figure 8:
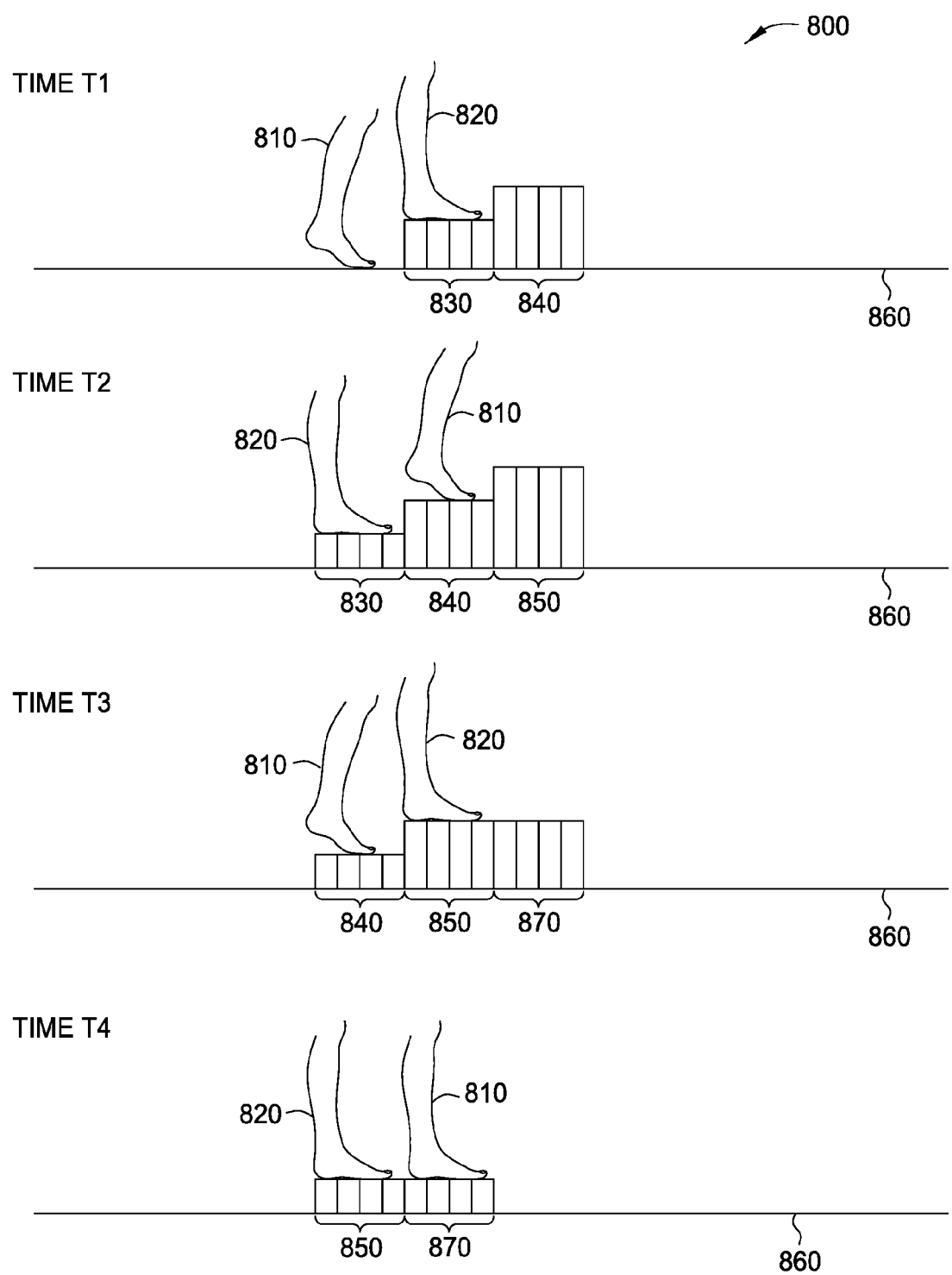
FIG. 8 is a diagram of a user walking on simulated stairs according to one embodiment described herein.

As the user walks upon the simulated stairs, sensors 114 detect the movement (step 642 of FIG. 6), and new VR topographical information is generated (step 644 of FIG. 6). FIG. 8 provides additional detail regarding these steps.

FIG. 8 is the diagram 800 of a user walking on simulated stairs on a treadmill according to one embodiment described herein, showing snapshots as time passes. In the diagram 800, the VR topographical information may be a virtual staircase in a house or steps carved into the side of a virtual mountain.

At time T1, a user's first foot 820 steps onto a first stair 830. As described above, the first stair 830 may correspond to a location of a virtual stair in the VR environment that has the same spatial relationship to the user's position in the VR environment as the first stair 830 has to the user on the treadmill. That way, if the user moves to step onto the virtual stair, she will step on the physical stair 830 on the treadmill. The user's second food 810 remains at the default level 860. As shown, the stair 830 includes a plurality of active elements (four in this case) which protrude at the same level in order to provide a substantially flat surface to form the top of the stair 830.

In this embodiment, the staircase in the VR environment has multiple stairs, and as a result, the treadmill controller raises the next group of active elements to form a second stair 840. Thus, if the user chooses to move to the next stair in the VR staircase, the treadmill already has the second stair 840 ready to receive the user's second foot 810.

At time T2, the user has moved the second foot 810 onto a second stair 840. Moreover, to keep the user centered, the treadmill has moved the top membrane and the stairs 830 and 840 from right to left to counter the user moving from left to right. In parallel, the treadmill controller lowers the height of the stairs 830 and 840. If done slowly, the user may not perceive that she is being lowered as she moves up the stairs. Lowering the height of the stairs is advantageous since the active elements do not have to protrude more and more to simulate the virtual staircase. Like above, the treadmill controller activates the next grouping of active elements to form a third stair 850 which corresponds to a third virtual stair in the VR environment.

In one embodiment, the movement of the stairs 830 and 840 from right to left occurs in response to detecting the motion of the user. That is, the stairs may not move laterally until the treadmill controller determines the user has moved her second foot 810 in order to place her foot on the second stair 840. However, once the user has both feet on the stairs, the treadmill controller may begin to lower both stairs regardless whether the user continues to move laterally along the treadmill. Put differently, the stairs on which the user has her feet can be lowered slowly at any time and do not need to wait for the user to move to the next stair. For example, if the user keeps her feet 820 and 810 at the locations shown at time T2, the treadmill controller may lower all the stairs (i.e., stairs 830, 840, and 850) at the same rate until the active elements forming the first stair 830 have recessed to the default level 860. Thus, the user first foot 820 would be at the default level 860 while the user's second foot 810 would still be raised above the default level 860 on the second stair 840.

At time T3, the user moves her first foot 820 off the first stair (which has now disappeared since the active elements have recessed to the default level 860) to the third stair 850. In this example, the third stair 850 corresponds to the last stair in the virtual staircase. As such, instead of forming a fourth stair, the treadmill controller generates a plateau 870 which has the same height as the third stair 850. The plateau 870 provides an intermediary position which the user can put a foot until the stairs 840 and 850 can be recessed down to the default level 860. Without the plateau 870, if the user where to move her foot 810 in front of foot 820, she may stumble since there is no additional step. Instead, the plateau 870 provides temporary support to the user foot 810 until the stair 850 and plateau 870 can be recessed to the default level 860.

Time T4 illustrates when the user has moved her second foot 810 to the plateau 870. In response, the treadmill controller moves the third stair 850 and plateau 870 from right to left and begins to reduce their height. Just in case, the treadmill controller could make the plateau 870 wide enough to accommodate the user taking an additional step forward using the first foot 820. Increasing the length of the plateau 870 provides additional time so that the treadmill controller can lower these features to the default level 860 if the features have not recessed to the default level 860 by the time the user takes another step.

In the embodiments above, the active elements forming each of the features—i.e., the first stair 830, second stair 840, third stair 850, and plateau 870—may move laterally to counter the movement of the user. In this embodiment, the treadmill may not have a top membrane but rather the tops of the active elements provide the interface on which the user steps. Alternatively, to move the features from right to left, the treadmill controller changes which active features are used to form the features. For example, at time T2, the controller may use four different active elements to form stair 830 than then active elements used to form the stair 830 at time T1. In this example, the active elements remain stationary and the treadmill controller changes the height of the active elements to simulate moving the stairs and plateau laterally which correspond to the later movements of the user. Moreover, although not shown, because the treadmill controller can activate active elements along a plane to form stairs at any location on the surface of the treadmill, the treadmill controller can simulate spiral staircases, or staircases that zig zag, using the embodiments described above.

Although the example above simulates a static staircase in a VR environment, the treadmill controller can also simulate a moving escalator in the VR environment. In one embodiment, the virtual escalator moves at a fixed speed and the user must maintain the same speed (travel velocity) on the treadmill using the stairs (although in the opposite direction) in order to stay in the center of the treadmill.

Figure 9:
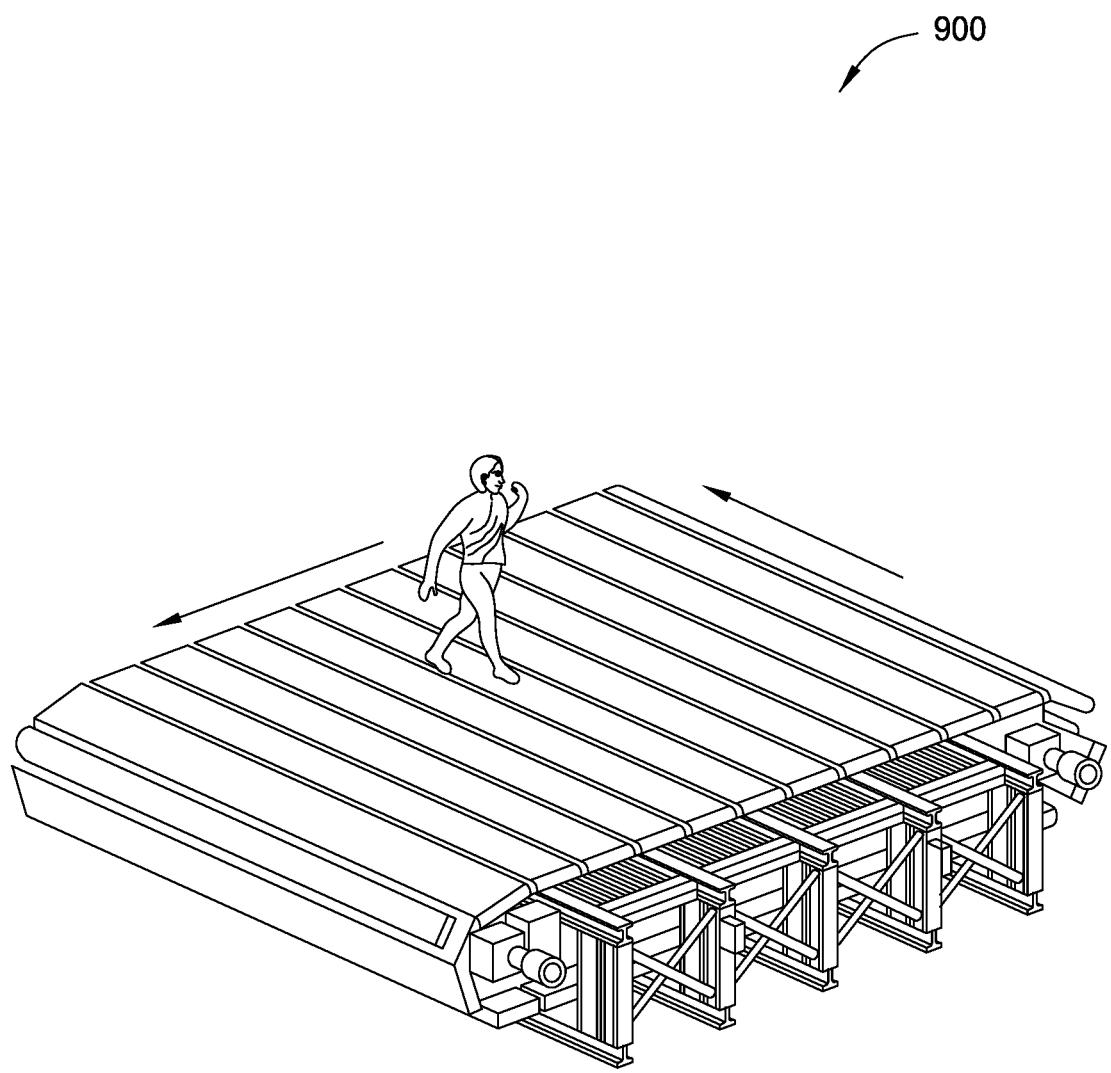
FIG. 9 is a two-dimensional omnidirectional treadmill according to one embodiment described herein.

FIG. 9 is a two-dimensional omnidirectional treadmill 900 according to one embodiment described herein. The omnidirectional treadmill 900 in includes a plurality of unidirectional treadmills oriented in parallel with each other along a first axis or first dimension (the direction that the user is currently facing). The rotation of each individual treadmill permits the user to walk in the direction that he is facing in FIG. 9.

To permit the user to walk towards his left (or right) along a second axis (perpendicular to the first axis) or second dimension all of the treadmills are moved/shifted to the left or to the right. Thus, a perpendicular translation mechanism moves the plurality of unidirectional treadmills along a second axis, wherein the second axis is perpendicular to the first axis. Geometrically, any direction along the surface of the treadmill may be described as a sum of a direction along the first axis and a direction along the second axis. Similarly, any movement may be described as the sum of a movement along the first axis plus a movement along the second axis. A two-dimensional omnidirectional treadmill can move its surface in any direction by combining (simultaneously or sequentially) a movement along the first axis with a movement along the second axis, thus allowing a user to walk in any direction while remaining centered on the treadmill.

Figure 10:
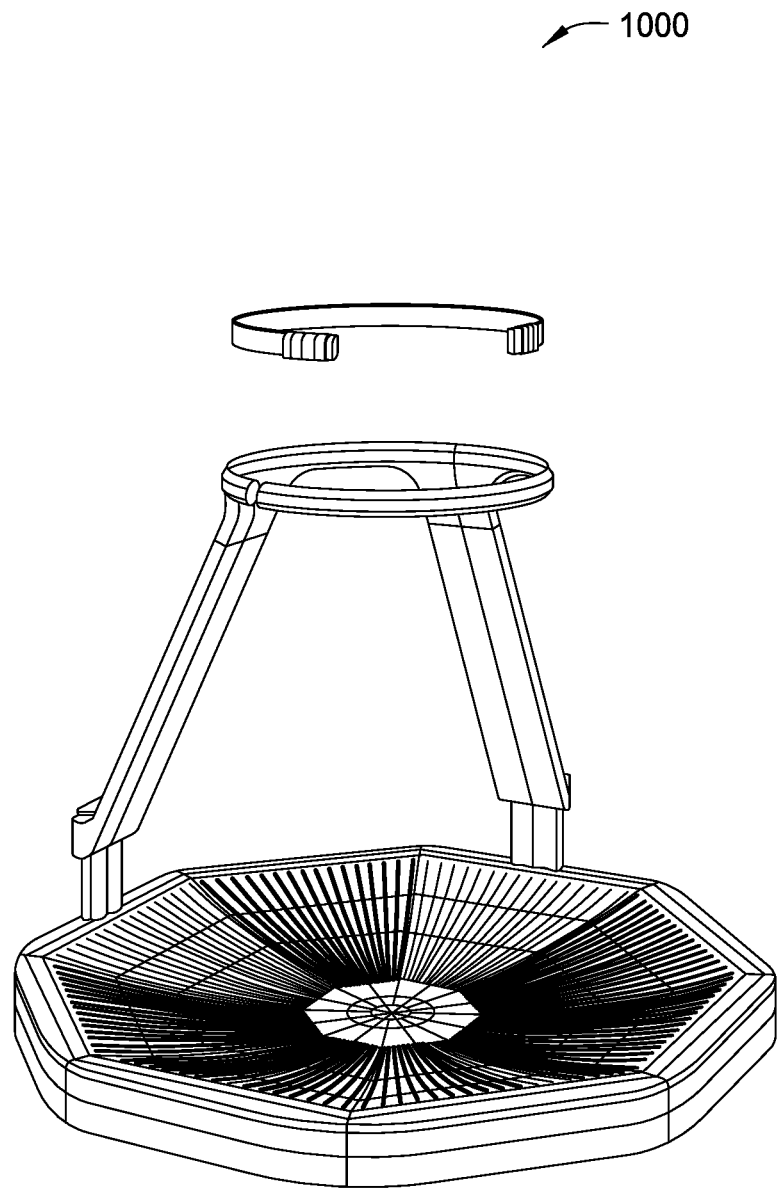
FIG. 10 is a frictionless omnidirectional treadmill according to one embodiment described herein.

FIG. 10 is a frictionless omnidirectional treadmill according to one embodiment described herein. In one embodiment, the surface of the frictionless omnidirectional treadmill is coated with a low friction material such as Teflon, and the user wears special socks or shoes that slide easily on the Teflon. In another embodiment, the user wears special shoes, each shoe including a large ball bearing that rolls along the surface of the frictionless omnidirectional treadmill.

The frictionless omnidirectional treadmill in FIG. 10 has a bowl shaped surface that tends to slide a user towards the center (and the bottom of the bowl) as the user walks away from the center. This treadmill may also have a harness and/or a ring that help the user to stay centered. The user may grab the ring with his arms to help turn herself, or may use radial grooves on the surface of treadmill to create rotational friction in order to rotate himself (turn left or turn right). Alternately, the user may rotate herself slowly using the (almost) frictionless surface of the treadmill.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
receiving VR (virtual reality) topographical information in a VR environment, wherein the VR environment is displayed to a user wearing a headset, and wherein the VR topographical information comprises information about a VR element in front of the user in the VR environment relative to a facing direction of the user in the VR environment;
controlling active elements in an omnidirectional treadmill to physically simulate the VR element in the VR topographical information on a surface of the omnidirectional treadmill on which the user stands by at least one of raising and lowering the surface, wherein the omnidirectional treadmill permits the user to move along at least two perpendicular directions of motion on the surface of the omnidirectional treadmill;
receiving sensor signals providing physical information about the user, wherein the physical information includes a direction and velocity of user motion on the omnidirectional treadmill;
transmitting the physical information to a VR controller to be used to move the user in the VR environment and modify topographical information proximate to the user in the VR environment; and
receiving the modified topographical information from the VR controller and using the modified topographical information to control the active elements, wherein the sensor signals include a first sensor signal from a first piezoelectric element associated with a first active element and a second sensor signal from a second piezoelectric element associated with a second active element.

2. The method of claim 1, wherein the VR topographical information represents a surface for a user avatar to travel on in the VR environment.

3. The method of claim 1, wherein the VR topographical information comprises a first virtual step and a second virtual step of a virtual staircase in the VR environment;
wherein controlling the active elements simulates a first and second physical step corresponding to the first and second virtual steps;
the method further comprising:
determining a first time at which the user steps on the first simulated step;
determining a second time at which the user steps upon the second simulated step;
determining a user travel velocity based upon the first time and the second time; and
moving the first and second physical steps at a rate proportional to the user travel velocity.

4. The method of claim 1, wherein the sensor signals include camera signals from a first camera, and
wherein the camera signals indicate the direction of the user motion on the omnidirectional treadmill.

5. The method of claim 1, wherein the first sensor signal indicates a force applied by a first foot of the user to the first active element.

6. The method of claim 1, wherein the physical information indicates a position of the user and a force applied by the user.

7. The method of claim 1, wherein the omnidirectional treadmill is a two-dimensional omnidirectional treadmill comprising:
a plurality of unidirectional treadmills oriented in parallel with each other along a first axis; and
a perpendicular translation mechanism configured to move the plurality of unidirectional treadmills along a second axis, wherein the second axis is perpendicular to the first axis.

8. The method of claim 1, wherein the omnidirectional treadmill is a frictionless omnidirectional treadmill.

9. The omnidirectional treadmill of claim 1, further comprising:
a camera configured to capture the sensor signals which indicate the direction of the user motion on the omnidirectional treadmill.

10. The omnidirectional treadmill of claim 1, wherein the first sensor signal indicates a force applied by a first foot of the user to the first active element.

11. The omnidirectional treadmill of claim 1, wherein the physical information indicates a position of the user and a force applied by the user.

12. An omnidirectional treadmill comprising:
a treadmill controller; and
active elements,
wherein the treadmill controller is configured to:
receive VR (virtual reality) topographical information in a VR environment, wherein the VR environment is displayed to a user wearing a headset, and wherein the VR topographical information comprises information about a VR element in front of the user in the VR environment relative to a facing direction of the user in the VR environment;
control the active elements to physically simulate the VR element in the VR topographical information on a surface of the omnidirectional treadmill on which the user stands by at least one of raising and lowering the surface, wherein the omnidirectional treadmill permits the user to move along at least two perpendicular directions of motion on the surface of the omnidirectional treadmill
receive sensor signals providing physical information about the user, wherein the physical information includes a direction and velocity of user motion on the omnidirectional treadmill;
transmit the physical information to a VR controller to be used to move the user in the VR environment and modify topographical information proximate to the user in the VR environment; and
receive the modified topographical information from the VR controller and using the modified topographical information to control the active elements, wherein the sensor signals include a first sensor signal from a first piezoelectric element associated with a first active element and a second sensor signal from a second piezoelectric element associated with a second active element.

13. The omnidirectional treadmill of claim 12, wherein the VR topographical information represents a surface for a user avatar to travel on in the VR environment.

14. The omnidirectional treadmill of claim 12, wherein the VR topographical information comprises a first virtual step and a second virtual step of a virtual staircase in the VR environment;
wherein controlling the active elements simulates a first and second physical step corresponding to the first and second virtual steps;
the treadmill controller is configured to:
determine a first time at which the user steps on the first simulated step;
determine a second time at which the user steps upon the second simulated step;
determine a user travel velocity based upon the first time and the second time; and
move the first and second physical steps at a rate proportional to the user travel velocity.

15. The omnidirectional treadmill of claim 12, wherein the omnidirectional treadmill is a two-dimensional omnidirectional treadmill comprising:
a plurality of unidirectional treadmills oriented in parallel with each other along a first axis; and
a perpendicular translation mechanism configured to move the plurality of unidirectional treadmills along a second axis, wherein the second axis is perpendicular to the first axis.

16. A computer program product for operating an omnidirectional treadmill, the computer program product comprising:
a computer-readable storage medium having computer-readable program code embodied therewith, the computer-readable program code executable by one or more computer processors to:
receive VR (virtual reality) topographical information in a VR environment, wherein the VR environment is displayed to a user wearing a headset, and wherein the VR topographical information comprises information about a VR element in front of the user in the VR environment relative to a facing direction of the user in the VR environment; and
control active elements in an omnidirectional treadmill to physically simulate the VR element in the VR topographical information on a surface of the omnidirectional treadmill on which the user stands by at least one of raising and lowering the surface, wherein the omnidirectional treadmill permits the user to move along at least two perpendicular directions of motion on the surface of the omnidirectional treadmill, wherein the VR topographical information comprises a first virtual step and a second virtual step of a virtual staircase in the VR environment, wherein controlling the active elements simulates a first and second physical step corresponding to the first and second virtual steps;
determine a first time at which the user steps on the first simulated step;
determine a second time at which the user steps upon the second simulated step;
determine a user travel velocity based upon the first time and the second time; and
move the first and second physical steps at a rate proportional to the user travel velocity.

* * * * *